(12) United States Patent
Heitzenrater et al.

(10) Patent No.: US 8,409,050 B2
(45) Date of Patent: Apr. 2, 2013

(54) GEAR RETENTION ASSEMBLY

(75) Inventors: Scott William Heitzenrater, Orion, MI (US); Boris Burgman, Oak Park, MI (US); Douglas John Dwenger, Plymouth, MI (US); John A. Diemer, Farmington Hills, MI (US); Randal William Arndt, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 596 days.

(21) Appl. No.: 12/616,699

(22) Filed: Nov. 11, 2009

(65) Prior Publication Data

US 2011/0111917 A1    May 12, 2011

(51) Int. Cl.
*F16H 57/08* (2006.01)
(52) U.S. Cl. ........................... 475/331; 475/344
(58) Field of Classification Search ............ 475/331, 475/344
See application file for complete search history.

(56) References Cited

U.S. PATENT DOCUMENTS 6,968,934 B2 * 11/2005 Yamamura et al. .......... 475/159
7,485,064 B2 *  2/2009 Rosochacki et al. ......... 475/230

* cited by examiner

*Primary Examiner* — David D Le
*Assistant Examiner* — Derek D Knight

(57) ABSTRACT

A gear retention assembly for retaining a gear that has a plurality of gear outer splines includes a gear housing and a retaining ring. The gear housing has a first end, a second end, and a plurality of inner splines each including a ramp portion. The second end of the gear housing includes an annular continuous rolled lip, where the continuous rolled lip and the ramp portions of the plurality of inner splines define a groove. The plurality of inner splines engage with the gear outer splines of the gear to transmit torque between the gear and the gear housing. The retaining ring is disposed in the groove and axially retains the gear. The rolled lip axially retains the retaining ring.

16 Claims, 2 Drawing Sheets

GEAR RETENTION ASSEMBLY

TECHNICAL FIELD

The present disclosure relates to gear retention assemblies, and more particularly to gear retention assemblies that retain ring gears of planetary gear sets.

BACKGROUND

The statements in this section merely provide background information related to the present disclosure and may or may not constitute prior art.

Automatic transmissions in vehicles often contain planetary gear sets to transmit one or more forward and reverse gear speed ratios between an engine and at least one drive axle. These planetary gear sets are often disposed in gear housings that restrict axial motion of one or more gear elements within the planetary gear set. For example, the ring gears may be limited by a housing that includes retention features, such as a pierced snap ring groove, a cut snap ring groove, stake features, or rolled tabs. These retention features experience high stress concentrations at high RPM operation of the automatic transmission. Therefore, there is a need for a new and improved gear retention assembly that can withstand higher RPM.

SUMMARY

In an aspect of the present invention, a gear retention assembly for retaining a gear that has a plurality of gear outer splines includes a gear housing and a retaining ring. The gear housing has a first end, a second end, and a plurality of inner splines each including a ramp portion, wherein the second end of the gear housing includes an annular continuous rolled lip, and wherein the continuous rolled lip and the ramp portions of the plurality of inner splines define a groove. The plurality of inner splines engage with the gear outer splines of the gear to transmit torque between the gear and the gear housing. The retaining ring is disposed in the groove. The retaining ring axially retains the gear and the rolled lip axially retains the retaining ring.

In another aspect of the present invention, the gear housing includes a first portion disposed adjacent the first end and having a first diameter, a second portion having a second diameter, and a third portion adjacent the second end and having a third diameter. The plurality of inner splines are disposed on the third portion.

In yet another aspect of the present invention, the gear retention assembly further includes a wall connecting the second portion and the third portion and opposing the retaining ring, wherein the wall includes a plurality of projections, and wherein the plurality of projections axially retain the gear.

In yet another aspect of the present invention, the third portion of the gear housing defines a plurality of fluid apertures.

In yet another aspect of the present invention, the gear retention assembly further includes a plurality of inner splines disposed on the third portion of the gear housing and a plurality of outer splines disposed on the gear and meshed with the plurality of inner splines on the third portion of the gear housing.

In yet another aspect of the present invention, the plurality of inner splines are formed out of the third portion of the gear housing.

In yet another aspect of the present invention, the continuous rolled lip is at an angle with respect to the third portion of the gear housing, wherein the angle is about 60 degrees.

In yet another aspect of the present invention, the retaining ring includes two beveled corners adjacent an outer radial surface of the retaining ring, wherein a first of the two beveled corners abuts and substantially matches an angle of the ramp portion of the plurality of inner splines, and wherein the second of the two beveled corners abuts and substantially matches an angle of the continuous rolled lip.

In yet another aspect of the present invention, the first portion circumscribes a shaft connected to a sun gear of a planetary gear set and a portion of a carrier of the planetary gear set, the second portion circumscribes the carrier and the shaft, and the third portion circumscribes the planetary gear set.

Further areas of applicability will become apparent from the description provided herein. It should be understood that the description and specific examples are intended for purposes of illustration only and are not intended to limit the scope of the present disclosure.

DESCRIPTION OF THE PREFERRED EMBODIMENTS

Figure 1:
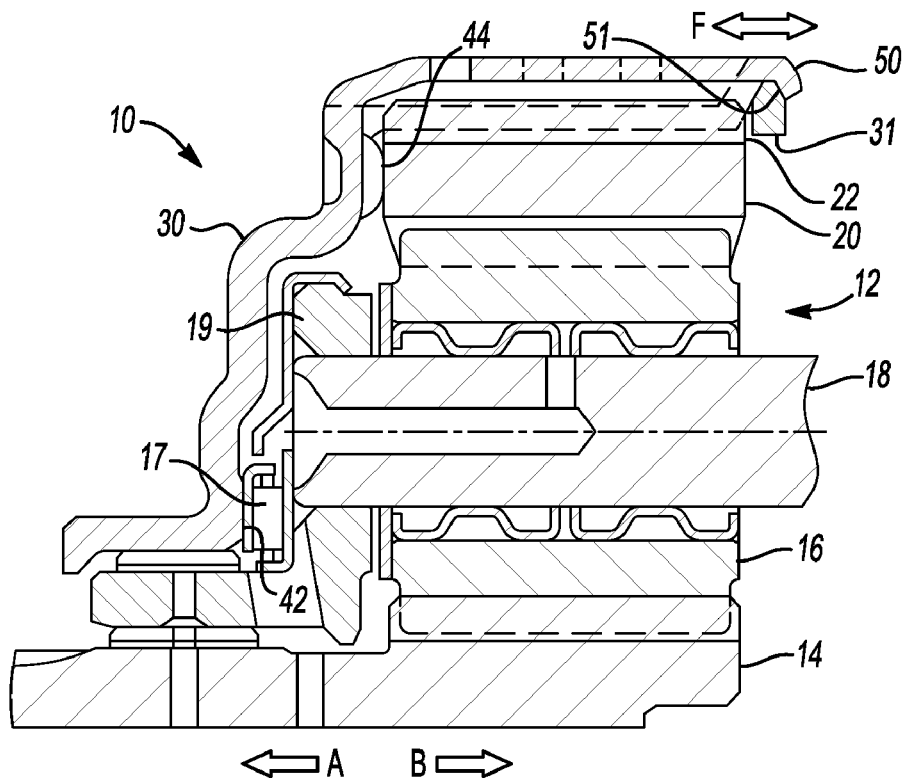
FIG. 1 is a side cross-sectional view of a gear retention assembly with a portion of an exemplary planetary gear set in accordance with an embodiment of the present invention.

Referring to the drawings, wherein like reference numbers refer to like components, in FIG. 1 a side view of a gear retention assembly 10 is illustrated in an operating environment, in accordance with an embodiment of the disclosure. In the example provided, the gear retention assembly 10 is disposed around a planetary gear set 12 in an automatic transmission of an automobile. The gear retention assembly 10, however, may be disposed around other rotary components in other environments without departing from the scope of the present invention. The planetary gear set 12 includes a sun gear 14 meshed with a plurality of planetary gears 16 disposed on pinion pins 18. The pinion pins are in turn supported by a carrier member 19. A first race of a bearing 17 is connected to the carrier member 19 to reduce friction during rotation. The planetary gears 16 are also meshed to the inside of a ring gear 20. The ring gear 20 has outer splines 22 that run axially along an outer surface of the ring gear 20.

Figure 2:
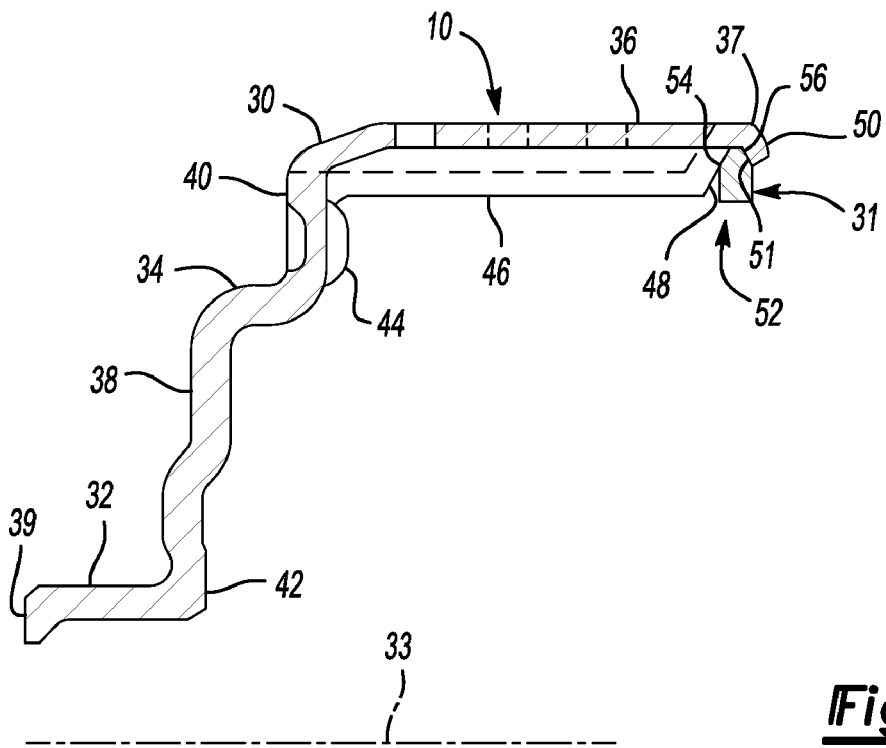
FIG. 2 is a side cross-sectional view of the gear retention assembly in accordance with an embodiment of the present disclosure.
Figure 3:
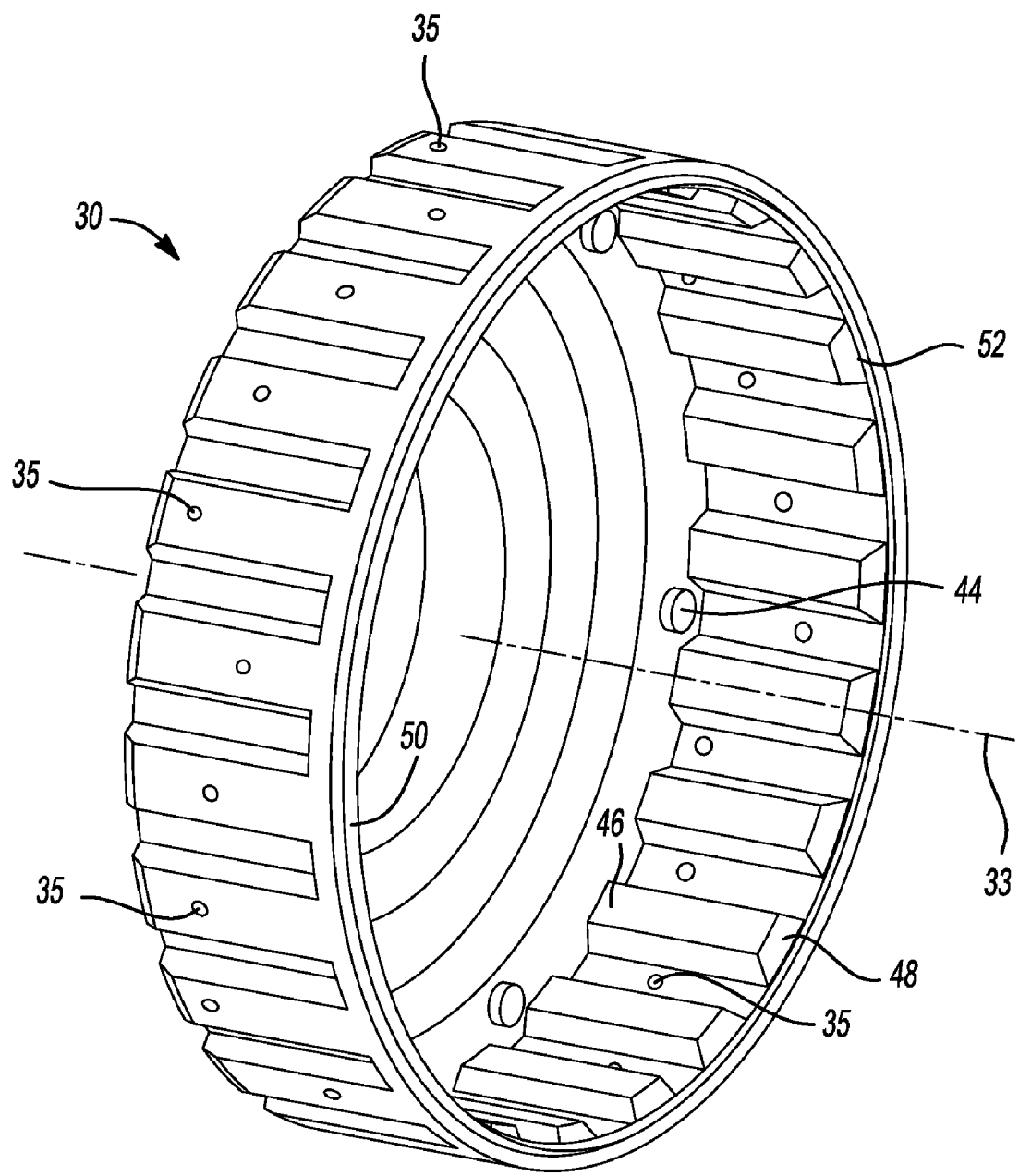
FIG. 3 is a perspective view of a gear housing in accordance with an embodiment of the present disclosure.

With reference to FIGS. 2 and 3, and with continued reference to FIG. 1, the gear retention assembly 10 includes a housing 30 and a retaining ring 31. The housing 30 is substantially annular in shape and has an axis 33. The planetary gear set 12 is concentric with and at least partially disposed within the housing 30, as will be described in greater detail below. The housing 30 has a first axial portion 32 with a first diameter, a second axial portion 34 with a second diameter, a third axial portion 36 with a third diameter. The first axial portion has a first end 39 and the third axial portion has a second end or end portion 37. The second diameter of the second axial portion 34 is larger than the first diameter of the first axial portion 32 and the third diameter of the third axial portion 36 is larger than the second diameter of the second axial portion 34. The first, second, and third diameters are preferably substantially constant. The axial portions 32, 34, and 36 are connected by a plurality of radially extending walls. For example, a first wall 38 connects the first portion 32 with the second portion 34 and a second wall 40 connects the second portion 34 with the third portion 38. A first surface 42 is disposed on the first wall 38, faces the end portion 37, and is connected to a second race of the bearing 17. A plurality of projections 44 are disposed on the second wall 40 facing the third portion 36 for axially retaining the ring gear 20 in a first direction A. In the example provided, the third axial portion 36 defines a plurality of fluid apertures 35 for draining hydraulic fluid that may be disposed between the ring gear 20 and the third axial portion 36.

A plurality of inner splines 46 are disposed on the radial interior side of the third axial portion 36. The inner splines 46 extend in the axial direction along the interior length of the third axial portion 36. Each inner spline 46 includes a ramp portion 48 that is disposed adjacent the end portion 37. In the example provided, the ramp portions 48 are at a constant angle with respect to the axis 33 to create a flat surface, however the ramp portions 48 may have other angles or varying angles with respect to the axis 33 without departing from the scope of the present invention. The inner splines 46 engage with the outer splines 22 of the ring gear 20 to rotationally couple the ring gear 20 with the housing 30. In the example provided, the inner splines 46 are formed out of the third axial portion 36.

A continuously rolled lip portion 50 is disposed on the end portion 37 of the housing 30. The lip portion 50 extends radially inward from the third axial portion 36 and runs along substantially the entire circumference of the end portion 37 of the housing 30. Preferably, the lip portion 50 is formed by rolling the end portion 37 after the retaining ring 31 has been installed in the housing. In the example provided, the lip portion 50 is at an angle of approximately 60 degrees with respect to the third axial portion 36. The lip portion 50, however, may be at other angles without departing from the scope of the present invention.

An annular groove 52 is defined by a gap between the lip portion 50 and the ramp portions 48 of the housing 30. The annular groove 52 extends along the entire inner circumference of the third axial portion 36. A lip surface 51 is disposed on a side of the lip portion 52 that faces the ramp portions 48. The size of the groove 52 depends on the angles and lengths of the ramp portions 48 and the lip portions 50.

The retaining ring 31 is an annular member having a diameter approximately equal to, or slightly less than, the inner diameter of the third axial portion 36 of the housing 30. The retaining ring 31 is disposed in the groove 52 of the housing 30. The retaining ring 31 preferably has beveled corners on an outer radial side of the retaining ring 31. For example, a first engagement surface 54 opposes the ramp portions 48 of the housing 30 and a second engagement surface 56 opposes the lip surface 51 of the housing. In the example provided, the first engagement surface 54 is at the same angle as the ramp portions 48 and the second engagement surface 56 is at the same angle as the lip surface 51. The engagement surfaces 54, 56, however, may be at other angles without departing from the scope of the present invention.

The gear retention assembly 10 at least partially surrounds the planetary gear set 12. More specifically, the first axial portion 32 of the housing 30 circumscribes a shaft connected to the sun gear 14 and a portion of the carrier member 19 of the planetary gear set 12. The second axial portion 34 circumscribes the carrier member 19 and the shaft connected to the sun gear 14. The third axial portion 36 circumscribes the planetary gear set 12. The splines 22 of the ring gear 20 engage with the splines 46 of the housing 30. The ring gear 20 is axially disposed between the retaining ring 31 and the projections 44.

With combined reference to FIGS. 1-3, during operation, the planetary gear set 12 may experience axial forces in the first direction A or a second direction B that are parallel with the axis 33. When the carrier member 18 experiences axial force in the first direction A, the first surface 42 of the housing contacts the carrier member 18 and limits axial movement of the carrier member 18 through the bearing 17. An axial force F on the ring gear 20 is transferred to either the projections 44 or the retaining ring 31 to limit axial movement of the ring gear 20. In the second direction B, the axial force F is transmitted from the outer splines 22 to the retaining ring 31. The second engagement surface 56 of the retaining ring 31 transfers the axial force F to the lip surface 51 of the lip portion 50. The lip portion 50 transfers the axial force F to the rest of the housing 30 to limit axial movement of the retaining ring 31 and the ring gear 20.

The present invention provides advantages over the prior art. Specifically, the present invention reduces stress in a gear housing to allow operation at high RPM. For example, the embodiments described above may operate at or above 12,000 RPM. Additionally, by holding the retaining ring between the ramp portion and the lip portion, an axial distance between the retaining ring and the gear may be integrated to allow some axial movement of the gear.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A gear retention assembly for retaining a gear that has a plurality of gear outer splines, the gear retention assembly comprising:
   a gear housing having a first end, a second end, and a plurality of inner splines each including a ramp portion, wherein the second end of the gear housing includes an annular continuous rolled lip, and wherein the continuous rolled lip and the ramp portions of the plurality of inner splines define a groove, and wherein the plurality of inner splines engage with the gear outer splines of the gear to transmit torque between the gear and the gear housing; and
   a retaining ring disposed in the groove,
   wherein the retaining ring axially retains the gear, and the rolled lip axially retains the retaining ring.

2. The gear retention assembly of claim 1, wherein the gear housing includes a first portion disposed adjacent the first end and having a first diameter, a second portion having a second diameter, and a third portion adjacent the second end and having a third diameter, and wherein the plurality of inner splines are disposed on the third portion.

3. The gear retention assembly of claim 2, further comprising a wall connecting the second portion and the third portion and opposing the retaining ring, wherein the wall includes a plurality of projections, and wherein the plurality of projections axially retain the gear.

4. The gear retention assembly of claim 2, wherein the third portion of the gear housing defines a plurality of fluid apertures.

5. The gear retention assembly of claim 2, wherein the plurality of inner splines are formed out of the third portion of the gear housing.

6. The gear retention assembly of claim 2, wherein the continuous rolled lip is at an angle with respect to the third portion of the gear housing, wherein the angle is about 60 degrees.

7. The gear retention assembly of claim 2, wherein the retaining ring includes two beveled corners adjacent an outer radial surface of the retaining ring, wherein a first of the two beveled corners abuts and substantially matches an angle of the ramp portion of the plurality of inner splines, and wherein the second of the two beveled corners abuts and substantially matches an angle of the continuous rolled lip.

8. The gear retention assembly of claim 2, wherein the first portion circumscribes a shaft connected to a sun gear of a planetary gear set and a portion of a carrier of the planetary gear set, the second portion circumscribes the carrier and the shaft, and the third portion circumscribes the planetary gear set.

9. A gear retention assembly disposed around a gear having outer splines, the gear retention assembly comprising:
an annular housing having a first axial portion having a first diameter, a second axial portion having a second diameter, a third axial portion having a third diameter, an end portion disposed adjacent the third axial portion and including a continuous rolled lip, and a plurality of inner splines disposed on a radial interior side of the third axial portion and each including a ramp portion adjacent to the end portion, wherein the third diameter is larger than the second diameter and the second diameter is larger than the first diameter; and
a retaining ring disposed between the continuous rolled lip and the ramp portion of the plurality of inner splines, and wherein the gear is axially restrained by the retaining ring and the retaining ring is axially restrained by the continuous rolled lip.

10. The gear retention assembly of claim 9, wherein the continuous rolled lip is continuous around an entire circumference of the end portion of the housing.

11. The gear retention assembly of claim 10, wherein the ramp portion is a flat surface disposed at an angle between an interior surface of the plurality of inner splines to the end portion of the housing.

12. The gear retention assembly of claim 9, wherein the first diameter, the second diameter, and the third diameter are substantially constant.

13. The gear retention assembly of claim 12, wherein the housing further includes a first wall disposed between the first axial portion and the second axial portion and a second wall disposed between the second axial portion and the third axial portion, wherein the first wall is substantially parallel with the second wall.

14. The gear retention assembly of claim 13, wherein the first wall of the housing includes a first surface facing the end portion and the second wall of the housing includes a plurality of projections that extend from the second wall towards the end portion, and wherein the first surface axially restrains a carrier member of a planetary gear set and the plurality of projections axially restrain the gear.

15. The gear retention assembly of claim 9, wherein the third axial portion of the housing defines a plurality of fluid apertures.

16. The gear retention assembly of claim 9, wherein the continuous rolled lip is a portion of the end portion of the housing that has been rolled over the retaining ring after the retaining ring has been placed on the ramp portion of the plurality of inner splines of the third portion of the housing.

* * * * *